United States Patent
Kato (10) Patent No.: US 12,054,687 B2
(45) Date of Patent: *Aug. 6, 2024

(54) SHOCK ABSORBER LUBRICANT COMPOSITION, SHOCK ABSORBER, AND METHOD FOR ADJUSTING FRICTION CHARACTERISTICS OF SHOCK ABSORBER LUBRICANT

(71) Applicant: KYB Corporation, Tokyo (JP)

(72) Inventor: Shinji Kato, Tokyo (JP)

(73) Assignee: KYB CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/919,810

(22) PCT Filed: Mar. 16, 2021

(86) PCT No.: PCT/JP2021/010476
§ 371 (c)(1),
(2) Date: Oct. 19, 2022

(87) PCT Pub. No.: WO2021/215144
PCT Pub. Date: Oct. 28, 2021

(65) Prior Publication Data
US 2023/0159845 A1    May 25, 2023

(30) Foreign Application Priority Data
Apr. 23, 2020   (JP) ................. 2020-076714

(51) Int. Cl.
*C10M 129/74* (2006.01)
*B60G 13/08* (2006.01)
(Continued)

(52) U.S. Cl.
CPC .......... *C10M 129/74* (2013.01); *B60G 13/08* (2013.01); *C10M 129/76* (2013.01);
(Continued)

(58) Field of Classification Search
CPC .............. C10M 129/74; C10M 129/76; C10M 169/04; C10M 2203/003; C10M 2207/283;
(Continued)

(56) References Cited

U.S. PATENT DOCUMENTS 6,300,293 B1 * 10/2001 Lamberth ............ C10M 137/10
508/436
11,214,751 B2    1/2022 Nagase et al.
(Continued)

FOREIGN PATENT DOCUMENTS

| JP | 861-060791 A | 3/1986 |
|---|---|---|
| JP | 2010-511774 A | 4/2010 |

(Continued)

OTHER PUBLICATIONS

Hiroshi Nakanishi, "Technical Trends and Tribology of Shock Absorber", Tribologist, 2009, pp. 598-603, vol. 54, No. 9 (w/partial English translation).

(Continued)

*Primary Examiner* — Ellen M McAvoy
(74) *Attorney, Agent, or Firm* — WHDA, LLP (57) ABSTRACT

Provided are a lubricant composition for shock absorbers, a lubricant additive, and a method of adjusting friction characteristics of a lubricant composition for shock absorbers, each capable of satisfying both the operational stability and ride comfort. The lubricant composition for shock absorbers contains a base oil and a friction adjusting agent, the friction adjusting agent contains pentaerythritol esters, and the pentaerythritol esters contain a pentaerythritol tetraester and a pentaerythritol ester other than the pentaerythritol tetraester.

12 Claims, 4 Drawing Sheets

(51) Int. Cl.
*C10M 129/76* (2006.01)
*C10M 169/04* (2006.01)
*F16F 9/32* (2006.01)
*C10N 40/08* (2006.01)

(52) U.S. Cl.
CPC ......... *C10M 169/04* (2013.01); *F16F 9/3278* (2013.01); *B60G 2202/24* (2013.01); *B60G 2800/162* (2013.01); *C10M 2203/003* (2013.01); *C10M 2207/283* (2013.01); *C10M 2207/289* (2013.01); *C10N 2040/08* (2013.01); *F16F 2222/04* (2013.01); *F16F 2230/04* (2013.01)

(58) Field of Classification Search
CPC ............. C10M 2207/289; B60G 13/08; B60G 2202/24; B60G 2800/162; F16F 9/3278; C10N 2040/08
See application file for complete search history.

(56) References Cited

U.S. PATENT DOCUMENTS

| | | | |
|---|---|---|---|
| 2008/0132436 | A1 | 6/2008 | Sherman |
| 2009/0005274 | A1* | 1/2009 | Swartele ............. C10M 177/00 508/110 |
| 2011/0306526 | A1* | 12/2011 | Germanaud ......... C10M 129/74 508/110 |
| 2015/0038384 | A1* | 2/2015 | Sakanoue ............ C10M 141/10 508/519 |
| 2015/0184107 | A1* | 7/2015 | Sakanoue ................. F16F 9/10 508/370 |
| 2019/0203152 | A1* | 7/2019 | Oppilliart ............ C10M 143/06 |
| 2019/0225908 | A1 | 7/2019 | Nagase et al. |
| 2021/0380897 | A1* | 12/2021 | Kato .................... C10M 169/04 |
| 2022/0204882 | A1* | 6/2022 | Kato ..................... F16F 9/3278 |
| 2023/0174882 | A1* | 6/2023 | Kato ..................... F16C 33/109 508/485 |
| 2023/0313064 | A1* | 10/2023 | Kato .................... C10M 171/00 508/485 |

FOREIGN PATENT DOCUMENTS

| | | |
|---|---|---|
| JP | 2013-199535 A | 10/2013 |
| JP | 2018-030978 A | 3/2018 |
| WO | 2020/218025 A1 | 10/2020 |

OTHER PUBLICATIONS

International Search Report dated Jun. 15, 2021, issued in counterpart international application No. PCT/JP2021/010476 (2 pages).

* cited by examiner

SHOCK ABSORBER LUBRICANT COMPOSITION, SHOCK ABSORBER, AND METHOD FOR ADJUSTING FRICTION CHARACTERISTICS OF SHOCK ABSORBER LUBRICANT

TECHNICAL FIELD

The present invention relates to a lubricant composition for shock absorbers, a shock absorber, and a method of adjusting the friction characteristics of a lubricant for shock absorbers.

BACKGROUND ART

It is conventionally known that the vibration damping force of a shock absorber is the sum of a hydraulic damping force generated at a valve and a frictional force generated at a sliding part between a piston rod and an oil seal or between a piston and a cylinder. It is also known that when the vibration damping force of a shock absorber is large, operational stability increases but ride comfort worsens; conversely, when the vibration damping force of a shock absorber is small, operational stability worsens but ride comfort gets better. In recent years, therefore, studies have been made focusing on ride comfort to decrease the frictional force of a lubricant for shock absorbers and decrease the vibration damping force of a shock absorber by adjusting a friction adjusting agent to be added to the lubricant for shock absorbers (for example, Non-Patent Document 1).

PRIOR ART DOCUMENT

Non-Patent Document

Non-Patent Document 1: Technical Trends and Tribology of Shock Absorber (Hiroshi Nakanishi, Tribologist, 2009 (Vol. 54), No. 9, page 598).

SUMMARY

Technical Problem

Shock absorbers exhibit their vibration damping force by reciprocating motion. It takes a certain amount of time for their hydraulic damping force to start up, while a frictional force is highly responsive so that at the time of transition from a stationary state to a sliding state or at the time of a minute amplitude, the frictional force becomes an important factor of the vibration damping force of shock absorbers. A reduction in the frictional force of a lubricant for shock absorbers to give priority to ride comfort as in the past however leads to such problems as a decrease in vibration damping force and a deterioration in operational stability. Particularly in recent years, many roads are in good condition and vibrations with a minute amplitude occur more than those with a normal amplitude, so that there is a demand for the development of a lubricant composition for shock absorbers capable of satisfying both operational stability and ride comfort at the time of transition from a stationary state to a sliding state or at the time of a minute amplitude.

An object of the present invention is to provide a lubricant composition for shock absorbers, a shock absorber, and a method of adjusting the friction characteristics of a lubricant for shock absorbers, each capable of satisfying both operational stability and ride comfort.

Solution to Problem

An aspect of the present invention is the following lubricant compositions for shock absorbers described in (1) to (4).

(1) A lubricant composition for shock absorbers containing a base oil and a friction adjusting agent, wherein the friction adjusting agent contains pentaerythritol esters and the pentaerythritol esters contain a pentaerythritol tetraester and a pentaerythritol ester other than the pentaerythritol tetraester.

(2) The lubricant composition for shock absorbers as described above in (1), wherein the pentaerythritol ester other than the pentaerythritol tetraester is a pentaerythritol diester.

(3) The lubricant composition for shock absorbers as described above in (1) or (2), wherein supposing that a friction coefficient at the time of transition from a stationary state to a sliding state is B and a friction coefficient in a sliding state is A, a mixing ratio of the pentaerythritol tetraester and the pentaerythritol ester other than the pentaerythritol tetraester is such that a spike index represented by (B−A)/A be 0.10 or more.

(4) The lubricant composition for shock absorbers as described above in any of (1) to (3), wherein the mixing ratio of the pentaerythritol tetraester in the pentaerythritol esters is 40% or more.

Another aspect of the present invention is the following shock absorbers described in (5) to (8).

(5) A shock absorber containing the lubricant composition for shock absorbers as described above in any of (1) to (4).

(6) The shock absorber as described above in (5), which is interposed between a body and an axle in a vehicle and wherein a mixing ratio of the pentaerythritol tetraester in the pentaerythritol esters is different between a lubricant composition for shock absorbers with which the shock absorber attached to a front wheel side is filled and a lubricant composition for shock absorbers with which the shock absorber attached to a rear wheel side is filled.

(7) The shock absorber as described above in (6), wherein supposing that a friction coefficient at the time of transition from a stationary state to a sliding state is B and a friction coefficient in a sliding state is A, a spike index represented by (B−A)/A is smaller in the lubricant composition for shock absorbers with which the shock absorber attached to the front wheel side is filled than in the lubricant composition for shock absorbers with which the shock absorber attached to the rear wheel side is filled.

A further aspect of the present invention is the following method of adjusting the friction characteristics of the lubricant for shock absorbers described in (8) or (10).

(8) A method of adjusting friction characteristics of a lubricant composition for shock absorbers containing a base oil and pentaerythritol esters, the pentaerythritol esters containing a pentaerythritol tetraester and a pentaerythritol ester other than the pentaerythritol tetraester, comprising adjusting a mixing ratio of the pentaerythritol tetraester and the pentaerythritol ester other than the pentaerythritol tetraester and thereby adjusting friction characteristics of the lubricant composition for shock absorbers.

(9) The method of adjusting friction characteristics of a lubricant composition for shock absorbers as described above in (8), wherein supposing that a friction coefficient at the time of transition from a stationary state to a sliding state is B and a friction coefficient in a sliding state is A, a mixing ratio of the pentaerythritol tetraester and the pentaerythritol ester other than the pentaerythritol tetraester is adjusted so that a spike index represented by (B−A)/A be 0.1 to 0.3.

(10) The method of adjusting friction characteristics of a lubricant composition for shock absorbers as described above in (8) or (9), wherein a mixing ratio of the pentaerythritol tetraester in the pentaerythritol esters is 40% or more.

Advantageous Effects of Invention

The present invention can provide a lubricant composition for shock absorbers, a lubricant additive, and a method of adjusting the friction characteristics of a lubricant for shock absorbers, each capable of satisfying both operational stability and ride comfort.

DESCRIPTION OF EMBODIMENTS

The lubricant composition for shock absorbers, shock absorber, and method of adjusting the friction characteristics of a lubricant for shock absorbers according to the present invention will hereinafter be described based on some drawings. It is to be noted that in the following description, the present invention will be described with a lubricant composition for shock absorbers as an example.

The lubricant for shock absorbers according to the present embodiment has (A) a base oil and (B) a friction adjusting agent and the friction adjusting agent (B) contains (B1) zinc dithiophosphate (which may hereinafter be called "ZnDTP") and (B2) pentaerythritol.

(A) Base Oil

The base oil in the lubricant for shock absorbers according to the present embodiment is a mineral oil and/or a synthetic oil. The kind of the mineral oil or synthetic oil is not particularly limited. Examples of the mineral oil include paraffinic mineral oils, intermediate-based mineral oils, and naphthenic mineral oils obtained by a conventional refining method such as solvent refining or hydrotreating. Examples of the synthetic oil include polybutenes, polyolefins [α-olefin (co)polymers], various esters (such as polyol esters, dibasic acid esters, and phosphoric acid esters), various ethers (such as polyphenyl ether), alkylbenzenes, and alkylnaphthalenes. In the present invention, as the base oil, the above-described mineral oils may be used alone or in combination of two or more; the above-described synthetic oils may be used alone or in combination of two or more; or one or more of the mineral oils may be used in combination with one or more of the synthetic oils.

(B) Friction Adjusting Agent

The lubricant for shock absorbers according to the present embodiment contains a friction adjusting agent. Although the friction adjusting agent is not particularly limited, it may contain a friction adjusting agent such as phosphorus-, amine-, or ester-based one. The friction coefficient of the lubricant for shock absorbers can be adjusted by adjusting an addition amount of the friction adjusting agent. The friction adjusting agent according to the present embodiment contains at least (B1) a zinc dithiophosphate and (B2) pentaerythritol esters as described below.

(B1) Zinc Dithiophosphate (ZnDTP)

A ZnDTP is typically a compound represented by the following Chemical formula 1 and it has a function of assisting the friction adjusting agent to adjust a friction coefficient.

[Chemical formula 1]

[in the aforesaid Chemical formula 1, Rs are each independently a hydrocarbon group and examples include linear primary alkyl groups, branched secondary alkyl groups, and aryl groups].

Although a plurality of kinds (structures) of ZnDTPs such as that having a primary alkyl group, that having a secondary alkyl group, and that having an aryl group are known, the lubricant for shock absorbers according to the present embodiment contains two kinds of ZnDTP as described below.

Described specifically, the lubricant for shock absorbers according to the present embodiment contains, as a first ZnDTP, a ZnDTP represented by the following Chemical formula 2:

[Chemical formula 2]

[in the formula 1, $R^{11}$ to $R^{14}$ are alkyl groups and these alkyl groups include a primary alkyl group and a secondary alkyl group. This means that one or more and three or less of $R^{11}$ to $R^{14}$ is/are a primary alkyl group and the other(s) of $R^{11}$ to $R^{14}$ is/are a secondary alkyl group].

The primary alkyl group of the first ZnDTP is not particularly limited. Examples include methyl, ethyl, n-propyl, n-butyl, n-pentyl, n-hexyl, n-heptyl, n-octyl, n-nonyl, n-decyl, isoamyl, isobutyl, 2-methylbutyl, 2-ethylhexyl, 2,3-dimethylbutyl, and 2-methylpentyl groups, with an alkyl group having from 4 to 12 carbon atoms (such as isobutyl group (having 4 carbon atoms) and 2-ethylhexyl group (having 8 carbon atoms)) being preferred.

The secondary alkyl group of the first ZnDTP is not particularly limited. Examples include isopropyl, sec-butyl, 1-ethylpropyl, 2-ethylhexyl, and 4-methyl-2-pentyl groups, with an alkyl group having 3 to 6 carbon atoms (such as isopropyl group (having 3 carbon atoms)) being preferred.

Although a ratio of the primary alkyl group and the secondary alkyl group in the first ZnDTP is not particularly limited, a ratio of the primary alkyl group is preferably higher than a ratio of the secondary alkyl group.

Although the content of the first ZnDTP is not particularly limited, the content of it in the lubricant for shock absorbers is preferably 0.1 mass % or more, more preferably 0.4 mass % or more. In addition, the content of the first ZnDTP in the lubricant for shock absorbers is preferably 4.0 mass % or less, more preferably 2.0 mass % or less.

Thus, since the lubricant for shock absorbers according to the present invention contains the first ZnDTP having both the primary alkyl group and the secondary alkyl group, addition of this friction adjusting agent can easily make a friction coefficient suitable for good ride comfort and operational stability. In addition, as will be described later, the lubricant for shock absorbers according to the present invention can suppress variation in friction coefficient and provide more improved ride comfort compared with the use of a lubricant for shock absorbers containing a ZnDTP having only a primary alkyl group and/or a ZnDTP having only a secondary alkyl group.

Further, the lubricant for shock absorbers according to the present embodiment has, as a friction adjusting agent, a second ZnDTP having a structure different from that of the first ZnDTP. The second ZnDTP is represented by the following Chemical formula 3:

[Chemical formula 3]

(2)

[in the formula 2, $R^{21}$ to $R^{24}$ are each a secondary alkyl group, meaning that the second ZnDTP does not have a primary alkyl group but has only a secondary alkyl group].

The number of carbon atoms of the secondary alkyl group which the second ZnDTP has is not particularly limited and examples of the secondary alkyl group include isopropyl, sec-butyl, 1-ethylpropyl, 2-ethylhexyl, and 4-methyl-2-pentyl groups. The secondary alkyl group is preferably an alkyl group having 3 to 8 carbon atoms (for example, an isopropyl group (having 3 carbon atoms), a 2-ethylhexyl group (having 8 carbon atoms), or an isobutyl group (having 4 carbon atoms)).

Although the content of the second ZnDTP is not particularly limited, it is preferably smaller than that of the first ZnDTP. It is preferably 20 wt % or less of the addition amount of ZnDTPs (a total amount of the first ZnDTP and the second ZnDTP).

The kind of the alkyl group contained in the ZnDTP can be determined by a known measurement method. For example, the structure of the ZnDTP can be determined using $C^{13}$-NMR or by analyzing whether the alkyl group is a primary alkyl group or a secondary alkyl group based on the characteristics of a P—O—C absorption band or P=S and P—S absorption bands by using the fingerprint region of FT-IR.

The friction adjusting agent containing, as the dithiophosphoric acid (B1), a second ZnDTP having only the secondary alkyl group can provide more improved ride comfort compared with that containing only the first ZnDTP. More specifically, it can reduce the microvibration during running compared with that containing only the first ZnDTP. Further, by using, as the second ZnDTP, a ZnDTP having a secondary alkyl group with 3 to 8 carbon atoms, a difference in friction coefficient between a minute amplitude (low speed) and a normal amplitude (high speed) can be reduced and improved ride comfort can be provided.

(B2) Pentaerythritol Esters

Pentaerythritol esters are each a tetravalent sugar alcohol and a compound in which a hydroxyl group, which is a terminal substituent of pentaerythritol, is ester bonded to a fatty acid residue. The pentaerythritol esters includes a pentaerythritol tetraester in which all four terminal substituents are ester bonded to a fatty acid residue and partial esters, that is, pentaerythritol monoester, pentaerythritol diester, and pentaerythritol triester in which any of terminal substituents are ester bonded to a fatty acid residue. In the following description, a pentaerythritol tetraester, a pentaerythritol triester, a pentaerythritol diester, and a pentaerythritol monoester will be abbreviated as PE4E, PE3E, PE2E, and PE1E, respectively.

In the pentaerythritol esters of the present invention, the fatty acid residue is not particularly limited and examples include $C_6$ to $C_{22}$ fatty acid residues such as stearic acid residue and oleic acid residue. As examples of the fatty acid residue, caprylic acid, capric acid, oleic acid, stearic acid, myristic acid, palmitic acid, linoleic acid, adipic acid, pelargonic acid, tall oil fatty acid, palm fatty acid, coconut fatty acid, and beef tallow fatty acid can be given.

In the lubricant for shock absorbers according to the present invention, the pentaerythritol esters (B2) contain (b21) PE4E and (b22) a pentaerythritol ester other than PE4E, that is, PE3E, PE2E, or PE1E. In the following description, PE2E will be used as the pentaerythritol ester other than EP4E (b22), but the pentaerythritol ester other than PE4E is not limited to PE2E and it may be PE3E or PE1E. As the pentaerythritol ester other than PE4E, a mixture pf PE3E and PE2E, a mixture of PE3E and PE1E, a mixture of PE2E and PE1E, or a mixture of PE3E, PE2E, and PE1E may be used.

Figure 1:
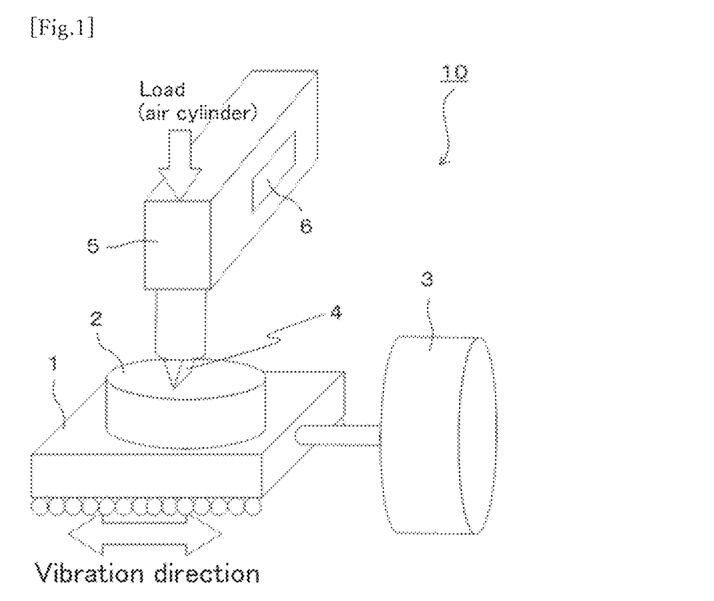
FIG. 1 is a view for explaining a friction tester used in the friction test of the lubricant composition of the present invention.

The friction characteristics of the lubricant composition of the present invention will hereinafter be described. In the present invention, a friction tester 10 having a structure as shown in FIG. 1 was used to analyze the friction characteristics of the lubricant composition. As shown in FIG. 1, the friction tester 10 is a pin-on-disk friction tester and it reciprocates a disk specimen 2 fixed on a slide bearing 1 by an electromagnetic exciter 3 and measures the frictional force, which has been generated by sliding the disk specimen while pressing a pin specimen 4 against it, by using a strain gauge 6 attached to a fixing shaft 5 of the pin specimen 4. A combination of a lubricant for shock absorbers and an oil seal serves as a factor that affects the friction characteristics of a shock absorber so that in the friction tester 10 shown in FIG. 1, an acrylonitrile butadiene rubber (NBR) to be used as an oil seal in a shock absorber is used as the pin specimen 4 and the pin specimen 4 is cut at the tip thereof to have an angle of 140° and resemble an oil lip. For the disk specimen 2, a hard chrome plated film to be applied to the surface of a piston rod is used. In the example shown in FIG.

1, the frictional force (friction coefficient) between the NBR pin specimen 4 and the chrome plated disk specimen 2 was measured, but the frictional force (friction coefficient) between a copper ball and the chrome plated disk specimen 2 may be measured.

The average friction coefficient of a lubricant composition was measured using the aforesaid friction tester 10 by reciprocating the pin specimen 4 and the disk specimen 2 at an amplitude of ±2.0 mm, a frequency of 1.5 Hz, a load of 20 N, and a temperature of 30° C. In the present Example, measured were a lubricant composition of Comparative Example 1 having only PE4E as the pentaerythritol esters (B2), a lubricant composition of Comparative Example 2 having only PE2E as the pentaerythritol esters (B2), and a lubricant composition of Example containing, as the pentaerythritol ester (B2), PE4E and PE2E at a mixing ratio of 8:2. Measurement results of the friction characteristics of Comparative Examples 1 and 2 and Example are shown in FIG. 2.

Figure 2:
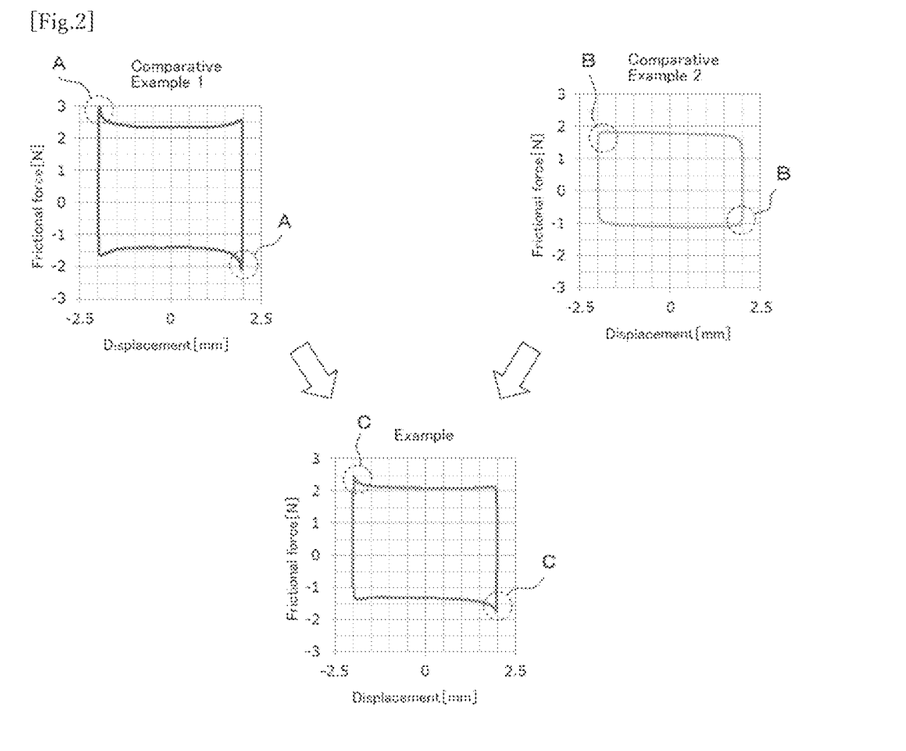
FIG. 2 is a view for explaining the friction characteristics of pentaerythritol esters.

As shown in FIG. 2, the lubricant composition of Comparative Example 1 containing only PE4E as the pentaerythritol esters has unique friction characteristics. More specifically, compared with that of Comparative Example 2, it shows an instantly (temporarily) increased frictional force at the time of transition from a stationary state to a sliding state (shown by a broken line A in FIG. 2) and shows a reduced frictional force after transition to a sliding state. The lubricant composition of Comparative Example 2 containing only PE2E as the pentaerythritol esters has a frictional force lower than that of Comparative Example 1 at the time of transition from a stationary state to a sliding state (shown by a broken line B in FIG. 2) and a difference in frictional force at the time of transition from a stationary state to a sliding state and a frictional force after transition to a sliding state becomes small. In Example using the mixture of PE4E and PE2E, a frictional force at the time of transition from a stationary state to a sliding state (shown by a broken line C in FIG. 2) is lower than that of Comparative Example 1 and higher than that of Comparative Example 2. In addition, a difference in frictional force between at the time of transition from a stationary state to a sliding state and frictional force in a sliding state is smaller than that of Comparative Example 1 and larger than that of Comparative Example 2.

Thus, it has been found that the lubricant composition containing a mixture of PE4E and PE2E can have friction characteristics between those of the lubricant composition of Comparative Example 1 containing only PE4E as the pentaerythritol esters and those of the lubricant composition of Comparative Example 2 containing only PE2E as the pentaerythritol esters.

Figure 3:
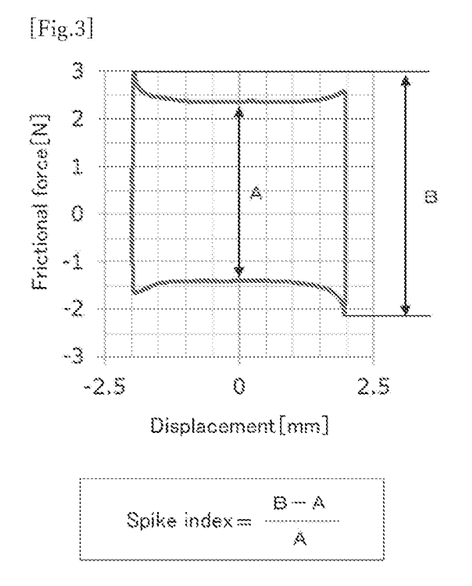
FIG. 3 is a view for explaining a spike index.

Next, whether or not the friction characteristics of a lubricant composition were controlled was investigated by adjusting the mixing ratio of PE4E and PE2E. To compare and investigate such friction characteristics, it is preferred to numerically express the friction characteristics achieved by adjusting the mixing ratio of PE4E and PE2E. First, the unique friction characteristic of the lubricant composition of the present invention, which is that the frictional force at the time of transition from a stationary state to a sliding state becomes higher than that in a sliding state, were therefore expressed numerically using a spike index. FIG. 3 is a view for explaining the spike index of the lubricant composition. In the graph showing the friction characteristics of the lubricant composition, supposing that the frictional force after transition to a sliding state is "A" and the frictional force at the time of transition from a stationary state to a sliding state is "B", the spike index is expressed as (B−A)/A.

In the relation between the mixing ratio of PE4E and PE2E (mixing ratio of PE4E) in pentaerythritol esters and a spike index of a lubricant composition, it has been found that the spike index becomes higher with an increase in the mixing ratio of PE4E. This means that the friction characteristic (spike characteristic) of the lubricant composition, which is that the frictional force at the time of the transition from a stationary state to a sliding state becomes higher than that in a sliding state, can be adjusted by adjusting the mixing ratio of PE4E and PE2E. This is an example of a spike index when a friction test is carried out using the aforesaid friction tester 10 under the aforesaid conditions (conditions under which a pin specimen 4 and a disk specimen 2 are reciprocated at an amplitude of +2.0 mm, a frequency of 1.5 Hz, a load of 20 N, and a temperature of 30° C.). The spike index is presumed to change as the material of the pin specimen 4 or disk specimen 2 or the condition such as amplitude, frequency or load in reciprocation is changed. The example is a mixing example of one PE4E and one PE2E. Alternatively, the spike characteristic may be adjusted by using a mixture of a plurality of PE4Es or a mixture of a plurality of PE2Es.

Figure 5:
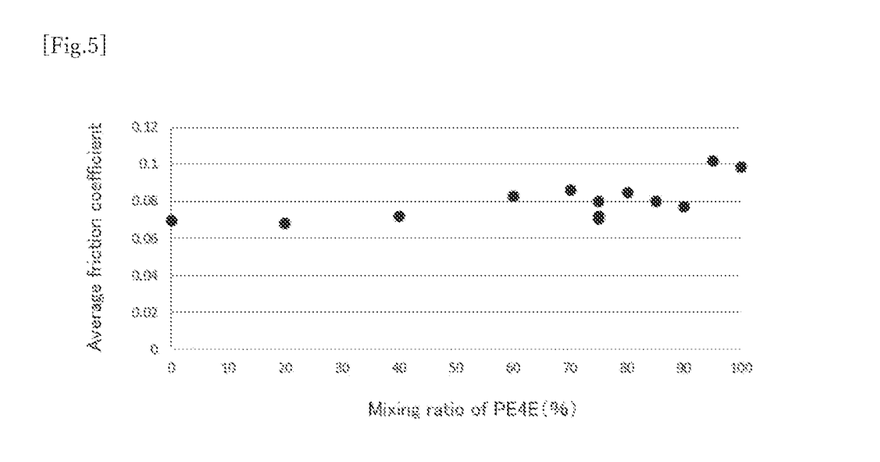
FIG. 5 is a graph showing the relation between the mixing ratio of a pentaerythritol tetraester and an average friction coefficient of a lubricant composition in a sliding state.

The relation between the mixing ratio of PE4E and PE2E (mixing ratio of PE4E) in pentaerythritol esters and an average friction coefficient of a lubricant composition in a sliding state is shown in FIG. 5. As shown in FIG. 5, no change (or a small change) in average friction coefficient of a lubricant composition in sliding state occurs in spite of an increase in the mixing ratio of PE4E until the mixing ratio of PE4E reaches 90%. This has revealed that the spike index of a lubricant composition can be changed by changing the mixing ratio of PE4E and PE2E (mixing ratio of PE4E) while causing almost no change in the average friction coefficient of the lubricant composition. The average friction coefficient of a lubricant composition can be adjusted even by a friction adjusting agent other than a pentaerythritol ester so that in the lubricant composition of the present embodiment, the average friction coefficient and spike index can be adjusted freely by changing the mixing ratio of PE4E and PE2E (mixing ratio of PE4E), making it possible to provide a lubricant composition having friction characteristics (that is, friction characteristics including an average friction coefficient and a spike index) suited for the need or purpose of drivers. When the mixing ratio of PE4E exceeds 90%, the average friction coefficient of a lubricant composition tends to be large. It is therefore preferred to adjust the mixing ratio of PE4E to 90% or less.

Further, the spike index of a lubricant composition can be adjusted by adjusting the carbon number of the fatty acid residue of the pentaerythritol esters. With an increase in the carbon number of the fatty acid residue of the pentaerythritol esters, the spike index of the lubricant composition tends to be smaller, while with a decrease in the carbon number of the fatty acid residue, the spike index of the lubricant composition tends to be larger. In addition to the adjustment of the mixing ratio of PE4E and PE2E or instead of the adjustment of the mixing ratio of PE4E and PE2E, the pentaerythritol esters may be selected while paying attention to the carbon number of the fatty acid residue which the pentaerythritol esters have so that the spike characteristic, that is, the spike index of the lubricant composition becomes a desired value. Alternatively, the spike index of the lubricant composition can be adjusted by using a plurality of pentaerythritol esters having fatty acid residues respectively different in carbon number.

Next, the influence of the friction characteristics of the lubricant composition of the present invention on a vehicle or driver was evaluated by an actual vehicle test. Described specifically, after a front-wheel shock absorber and a rear-wheel shock absorber of a vehicle were filled with each of lubricant compositions obtained by changing the mixing ratio of PE4E and PE2E to various ones, professional drivers were asked to drive the vehicle on a dirt course. The mixing ratio of PE4E in the front-wheel shock absorber and that in the rear-wheel shock absorber and evaluation results by the professional driver are shown in the following Table 1.

tion has increased", "The front moves up and down too much at the high-speed corner", "The movement on the spring is too large", and the like.

In Example 4, a road test was carried out by driving the vehicle in a state as in Example 1 and then, replacing the lubricant composition of the rear-wheel shock absorber by a lubricant composition containing, as the pentaerythritol esters, PE4E and PE2E at a mixing ratio of 9:1. As a result, the following evaluations were obtained from the driver:

TABLE 1

| | Front-wheel shock absorber | Rear-wheel shock absorber | Evaluation by driver |
|---|---|---|---|
| Ex. 1 | 100%→80% | 100% | The damper moves as expected, depending on the steering wheel turning amount.<br>The reaction is linear.<br>The front sinks.<br>The entering manner of the head at the beginning of the corner is good.<br>Can drive at a predetermined steering angle at the corner exit. |
| Ex. 2 | 80% | 100%→80% | Traction has increased.<br>The rear tightly grips the ground to inevitably cause understeer.<br>The rear is too soft. |
| Ex. 3 | 80%→0% | 80% | The front is pulled. Traction increases.<br>The front moves up and down too much at the high-speed corner.<br>The movement on the spring is too large. |
| Ex. 4 | 80% | 100%→90% | Easy to drive, well-balanced, and neutral.<br>Moves linearly<br>The posture can be controlled as expected and a corrective steering is not necessary. |
| Ex. 5 | 80%→70% | 90% | Good traction<br>The sinking amount of the front is large and pitching and rolling occur frequently.<br>The rolling seems large particularly when the vehicle enters the corner with a load on the front. |

For example, in Example 1, a road test was carried out by driving a vehicle while filling a front-wheel shock absorber and a rear-wheel shock absorber with a lubricant composition containing only PE4E as the pentaerythritol esters and then, replacing the lubricant composition of only the front-wheel shock absorber by a lubricant composition containing, as the pentaerythritol esters, PE4E and PE2E at a mixing ratio of 8:2. As a result, the following evaluations were obtained from the driver: "The damper moves as expected, depending on the steering wheel turning amount", "The reaction is linear (the steering wheel turning amount and yaw rate react proportionally)", "The front sinks", "The entering manner of the head at the beginning of the corner is good", "Can drive at a predetermined steering angle at the corner exit", and the like.

In Example 2, a road test was carried out by driving the vehicle in a state as in Example 1 and then, replacing the lubricant composition of the rear-wheel shock absorber by a lubricant composition containing, as the pentaerythritol esters, PE4E and PE2E at a mixing ratio of 8:2. As a result, the following evaluation was obtained from the driver: "traction has increased", "the rear tightly grips the ground to inevitably cause understeer", "the rear is too soft", and the like.

In Example 3, a road test was carried out by driving the vehicle in a state as in Example 2 and then, replacing the lubricant composition of the front-wheel shock absorber by a lubricant composition containing, as the pentaerythritol esters, only PE2E. As a result, the following evaluations were obtained from the driver: "The front is pulled", "Trac- "Easy to drive", "Well-balanced", "Neutral", "Moves linearly", "The posture can be controlled as expected and a corrective steering is not necessary", and the like.

In Example 5, a road test was carried out by driving the vehicle in a state as in Example 4 and then, replacing the lubricant composition of the front-wheel shock absorber by a lubricant composition containing, as pentaerythritol esters, PE4E and PE2E at a mixing ratio of 7:3. As a result, the following evaluations were obtained from the driver: "Good traction", "The sinking amount of the front is large and pitching, and rolling occur frequently", "The rolling seems large particularly when the vehicle enters the corner with a load on the front", and the like.

It has been found from the above results that when the mixing ratio of PE4E in the pentaerythritol esters is higher, the vibrations of the vehicle body (vibrations at the portion above the shock absorber and vertical and horizontal vibrations) are small, the vibrations tend to stop immediately even if any, and the running stability tends to be high. It has also been found that since the vibrations of the vehicle body are small, the vehicle can be steered at a steering angle corresponding to the steering wheel turning amount (understeer is suppressed) at a corner and the controllability tends to be high. While when the mixing ratio of PE4E in the pentaerythritol esters is smaller, it has been found that the traction tends to be high.

Thus, there is a trade-off relation between the stability and controllability of a vehicle body and the traction and from the results of the present actual vehicle test and another road test (including the drive at an actual racing competition), it has been found that the spike index is preferably in the following range. Described specifically, the spike index is preferably 0.1 or more, more preferably 0.15 or more, still more preferably 0.2 or more. Further, the spike index is thought to be preferably adjusted to 0.4 or less. Adjustment of the spike index within such a range has been found to improve the balance between the stability and controllability of a vehicle body and the traction. In order to obtain such a spike index, the mixing ratio of PE4E is preferably adjusted to 40% or more, more preferably 60% or more. When the present actual vehicle test was made under the conditions shown in Example 4, the best evaluation was obtained from the driver, meaning that the vehicle body has improved stability and controllability by making the spike index in the front-wheel shock absorber smaller than that in the rear-wheel shock absorber.

Figure 6:
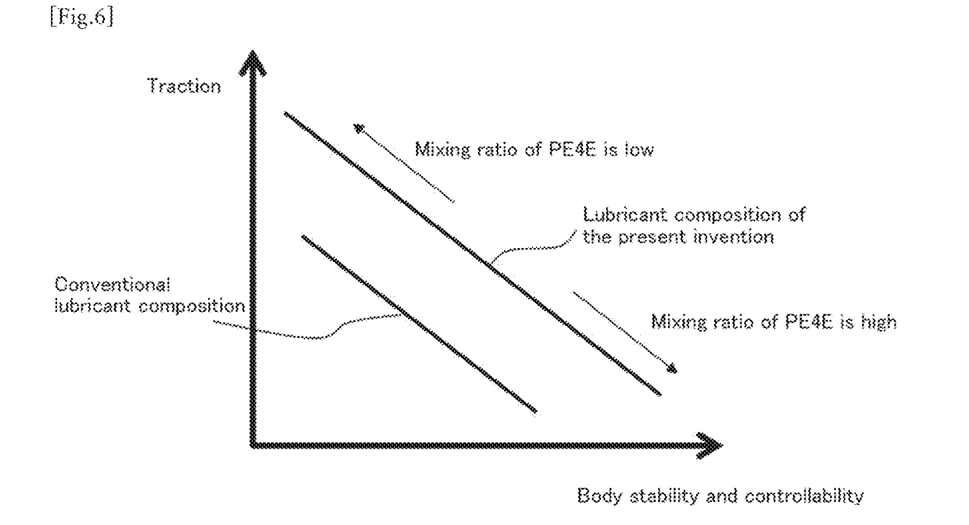
FIG. 6 is a view for explaining the adjustment of the friction characteristics of the lubricant composition of the present invention and adjustment of the friction characteristics of a conventional lubricant composition.

Thus, it has been found that by adjusting the mixing ratio of PE4E in pentaerythritol esters, the friction characteristics of the lubricant composition of the present invention can be adjusted and as a result, the stability and controllability of a vehicle body and the traction, which are in a trade-off relation, can be controlled. Also in a conventional lubricant composition, it is presumed that the relation between the stability and controllability of a vehicle body and the traction may be controlled to some extent by changing the kind or amount of a friction adjusting agent and thereby adjusting the average friction coefficient during running. In the lubricant composition of the present invention, however, by changing the mixing ratio of PE4E and PE2E (mixing ratio of PE4E), the spike index of the lubricant composition can be changed without virtually changing the average friction coefficient of the lubricant composition. By using the adjustment of an average friction coefficient by a conventional friction adjusting agent in combination, therefore, the friction characteristics (that is, friction characteristics including an average friction coefficient and spike index) can be controlled more widely and a lubricant composition capable of satisfying the need or purpose of a driver more can be provided. As a result, when the lubricant composition of the present invention is used, the stability and controllability of a vehicle body and traction are high (improved) as shown in FIG. 6 compared with the use of a conventional lubricant composition so that the traction and the stability and controllability of a vehicle body can be adjusted at a high level (effectiveness).

As described above, the lubricant composition of the present invention contains, as a friction adjusting agent, pentaerythritol esters (B2) and the pentaerythritol esters (B2) contain a pentaerythritol tetraester (b21) and a pentaerythritol ester other than the pentaerythritol tetraester (b22). The lubricant composition thus containing, as the pentaerythritol esters, PE4E and a pentaerythritol ester other than PE4E can adjust the stability and controllability of a vehicle body and traction at a higher level (effectiveness) than a conventional lubricant composition.

Preferred embodiment examples of the present invention were described above, but the technical scope of the present invention is not limited to or by the description of the aforesaid embodiments. Various modifications or improvements may be added to the aforesaid embodiment examples and embodiment to which such modifications or improvements have been added are also embraced in the technical scope of the present invention.

For example, in addition to the aforesaid embodiments, the pentaerythritol esters of a lubricant composition may be "composed mainly of PE4E". The term "composed mainly of PE4E" as used herein means pentaerythritol esters containing PELE, PE2E, PE3E, and/or PE4E and having the highest amount of PE4E; or pentaerythritol esters having a PE4E content of 50% or more. It is possible to define a pentaerythritol ester commercially available as "PE4E" as the pentaerythritol esters "composed mainly of PE4E" in the present invention.

The pentaerythritol esters "composed mainly of PE4E" can also be defined as follows. Described specifically, the number of the ester groups of pentaerythritol esters containing PE3E, PE2E, and PE1E, as well as PE4E is measured and pentaerythritol esters whose average number of the ester groups is more than 3 are specified as the pentaerythritol esters "composed mainly of PE4E". It is also possible to specify pentaerythritol esters, whose average number of hydroxyl groups is less than 1 as a result of the measurement of hydroxyl groups, as the pentaerythritol esters "composed mainly of PE4E". The average number of the ester groups or hydroxyl groups of pentaerythritol esters can be measured using, for example, gas chromatography mass analysis or liquid chromatography mass analysis.

Such pentaerythritol esters mainly contain hydroxyl-free PE4E but partially contain hydroxyl-containing PE3E, PE2E, and PE1E. The hydroxyl value of these hydroxyl-containing pentaerythritol is preferably 0.5 mgKOH/g or more, more preferably 1.0 mgKOH/g or more, still more preferably 1.5 mgKOH/g or more.

Figure 7:
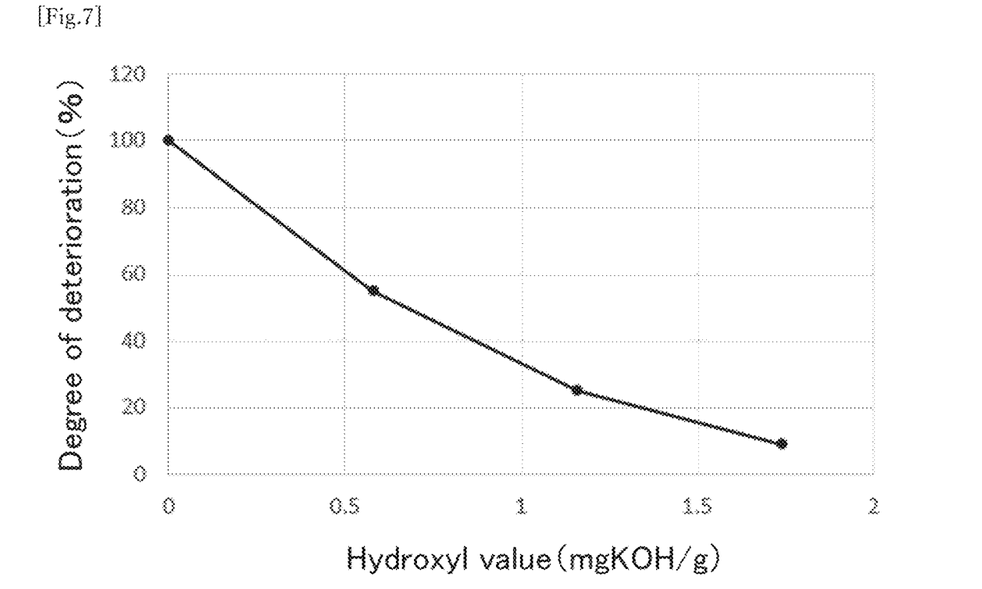
FIG. 7 is a graph showing the relation between the hydroxyl value of the lubricant for shock absorbers and the degree of deterioration of the lubricant for shock absorbers.

The lubricant for shock absorbers has improved abrasion resistance by adjusting the hydroxyl value thereof to 0.5 mgKOH/g or more and thereby suppressing the decomposition of pentaerythritol (deterioration of the lubricant for shock absorbers due to the decomposition of pentaerythritol). FIG. 7 is a graph showing the relation between the hydroxyl value of the lubricant for shock absorbers and a deterioration degree of the lubricant for shock absorbers. In the example shown in FIG. 7, measured was the degree of deterioration of lubricants for shock absorbers obtained by adjusting the addition amount of pentaerythritol esters, that is, a lubricant (Sample 1) for shock absorbers having a hydroxyl value of 0 mgKOH/g, a lubricant (Sample 2) for shock absorbers having a hydroxyl value of 0.58 mgKOH/g, a lubricant (Sample 3) for shock absorbers having a hydroxyl value of 1.16 mgKOH/g, and a lubricant (Sample 4) for shock absorbers having a hydroxyl value of 1.74 mgKOH/g as shown below in Table 2. The degree of deterioration of each of the aforesaid lubricants for shock absorbers was measured by using a FALEX-LFW1 tester, which is a Block-on-Ring friction and wear testing machine, after feeding the sliding unit of the tester with 250 ml of each of the aforesaid lubricants for shock absorbers, sliding it at a velocity of 0.6 m/s and a load of 6581 N, and then removing the sludge by a centrifugal separator.

TABLE 2

|  | Hydroxyl value (mgKOH/g) | Degree of deterioration (%) |
|---|---|---|
| Sample 1 | 0 | 100 |
| Sample 2 | 0.58 | 55 |
| Sample 3 | 1.16 | 25.2 |
| Sample 4 | 1.74 | 9.1 |

As shown in FIG. 7 and the above Table 2, the degree of deterioration of a lubricant for shock absorbers was suppressed to 55% even in the operation of a shock absorber corresponding to 2 million times, by increasing the addition amount of pentaerythritol esters and adjusting the hydroxyl value of the lubricant for shock absorbers to 0.58 mgKOH/g. Further, the degree of deterioration of a lubricant for shock absorbers was decreased to 9.1%, which was less than 10%, even in the operation of a shock absorber corresponding to 2 million times, by increasing the addition amount of pentaerythritol esters further and adjusting the hydroxyl value of the lubricant for shock absorbers to 1.74 mgKOH/g. Thus, the results have revealed that with an increase in the hydroxyl value of a lubricant for shock absorbers, the degree of deterioration of a lubricant for shock absorbers tends to be smaller. In particular, from the standpoint of suppressing the deterioration of a lubricant for shock absorbers, the hydroxyl value of the lubricant for shock absorbers is preferably 0.5 mgKOH/g or more, more preferably 1.0 mgKOH/g or more, still more preferably 1.5 mgKOH/g or more.

Figure 8:
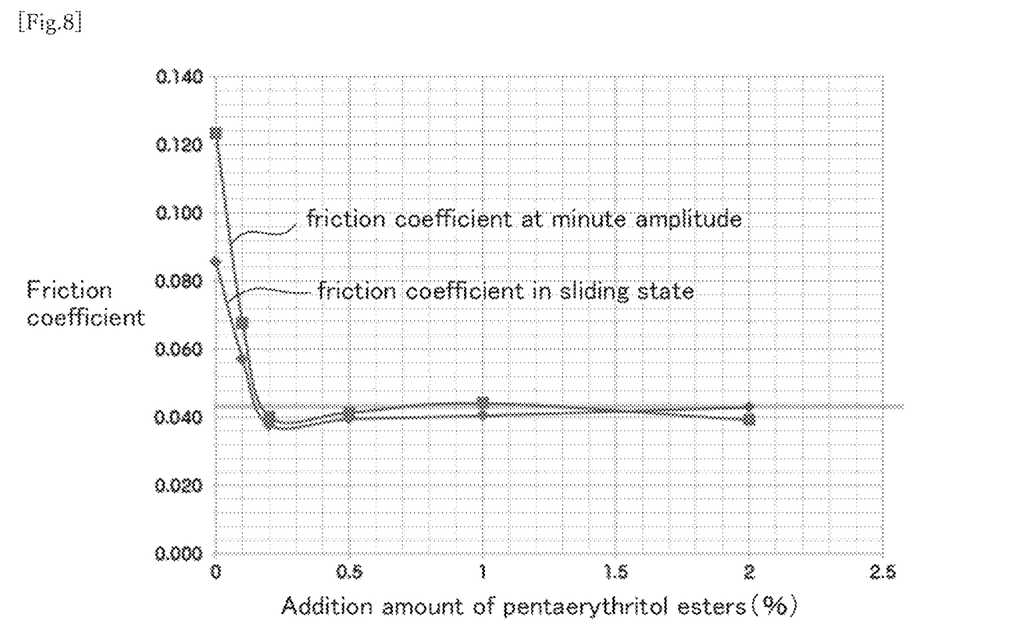
FIG. 8 is a graph showing the relation between the friction coefficient of a ZnDTP-added lubricant for shock absorbers and a pentaerythritol ester content.

The lubricant for shock absorbers may have such a constitution that it contains 0.5 mass % or more, more preferably 1.0 mass % or more, of pentaerythritol esters. FIG. 8 is a graph showing the relation between the friction coefficient of a ZnDTP-added lubricant for shock absorbers and a pentaerythritol ester content. As shown in FIG. 8, when the lubricant has a pentaerythritol ester content of 0.2 mass % or more, the friction coefficient of the ZnDTP-added lubricant for shock absorbers does not change and can be kept in the range of 0.02 to 0.05. Thus, by adjusting the pentaerythritol ester content to 0.2 mass % or more, variation in friction coefficient of the ZnDTP-containing lubricant for shock absorbers can be suppressed. Considering the decomposition of the pentaerythritol esters, the pentaerythritol ester content may be set to 0.5 mass % or more, preferably 1.0 mass % or more.

Figure 9:
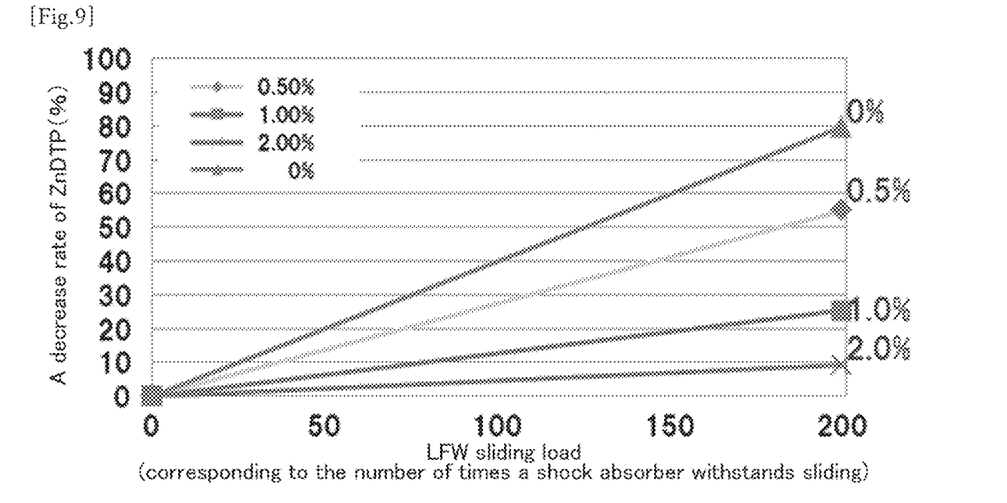
FIG. 9 is a graph showing the relation between a decreasing ratio of ZnDTP and an addition amount of pentaerythritol.

The lubricant for shock absorbers is also preferred to have a constitution such that it has a pentaerythritol ester content of 2.0 mass % or more, because without the pentaerythritol esters, ZnDTP may decrease due to the decomposition or the like, which increases the friction coefficient of the lubricant for shock absorbers and causes wear. FIG. 9 is a graph showing the relation between a decreasing ratio of ZnDTP and an addition amount of pentaerythritol. In the example shown in FIG. 9, similar to FIG. 7, a ZnDTP content was measured by FT-IR after feeding the sliding unit of a FALEX-LFW1 tester, that is, a Block-on-Ring friction and wear testing machine, with 250 ml of a lubricant additive, sliding it at a velocity of 0.6 m/s and a load of 6581 N, and removing the sludge by a centrifugal separator. It has been found from FIG. 9 that without addition of pentaerythritol, the ZnDTP content decreased by about 80% in the operation of a shock absorber corresponding to 2 million times (200 ten thousand times). On the other hand, addition of 0.5 mass % of pentaerythritol suppressed a decrease in ZnDTP to about 55% in the operation of a shock absorber corresponding to 2 million times (200 ten thousand times); addition of 1.0 mass % of pentaerythritol suppressed a decrease in ZnDTP to about 25% in the operation of a shock absorber corresponding to 2 million times (200 ten thousand times); and addition of 2.0 mass % of pentaerythritol suppressed a decrease in ZnDTP to about 9% in the operation of a shock absorber corresponding to 2 million times (200 ten thousand times). Thus, a lubricant for shock absorbers having a pentaerythritol ester content of 2.0 mass % or more can effectively suppress a decrease in ZnDTP and as a result, it can be suppressed from deterioration.

Further, a lubricant for shock absorbers has more preferably such a constitution that it has a pentaerythritol ester content of 5.0 mass % or more. The reason is as follows: as shown in FIG. 7, the hydroxyl value of a lubricant for shock absorbers is preferably adjusted to 0.5 mgKOH/g or more to suppress the deterioration of the lubricant for shock absorbers, but since the pentaerythritol esters contained in the lubricant for shock absorbers are mainly a hydroxyl-free pentaerythritol tetraester, it is preferred to adjust the pentaerythritol ester content to 5 mass % or more to adjust the hydroxyl value of the lubricant for shock absorbers to 0.5 mgKOH/g or more.

The invention claimed is:

1. A lubricant composition for shock absorbers, comprising a base oil and a friction adjusting agent, wherein
   the friction adjusting agent contains pentaerythritol esters,
   the pentaerythritol esters contain a pentaerythritol tetraester and a pentaerythritol ester other than the pentaerythritol tetraester, and
   the pentaerythritol tetraester is contained in a ratio of 90% or less in the pentaerythritol ester, and the pentaerythritol ester other than the pentaerythritol tetraester is contained in a ratio of 10% or more in the pentaerythritol ester.

2. The lubricant composition for shock absorbers according to claim 1, wherein the pentaerythritol ester other than the pentaerythritol tetraester is a pentaerythritol diester.

3. A lubricant composition for shock absorbers, comprising a base oil and a friction adjusting agent, wherein
   the friction adjusting agent contains pentaerythritol esters,
   the pentaerythritol esters contain a pentaerythritol tetraester and a pentaerythritol ester other than the pentaerythritol tetraester, and
   supposing that a friction coefficient at the time of transition from a stationary state to a sliding state is B and a friction coefficient in a sliding state is A, a mixing ratio of the pentaerythritol tetraester and the pentaerythritol ester other than the pentaerythritol tetraester is such that a spike index represented by (B−A)/A is 0.10 or more.

4. The lubricant composition for shock absorbers according to claim 3, wherein the mixing ratio of the pentaerythritol tetraester and the pentaerythritol ester other than the pentaerythritol tetraester is such that the spike index is 0.15 or more.

5. A lubricant composition for shock absorbers, comprising a base oil and a friction adjusting agent, wherein
   the friction adjusting agent contains pentaerythritol esters,
   the pentaerythritol esters contain a pentaerythritol tetraester and a pentaerythritol ester other than the pentaerythritol tetraester, and
   the mixing ratio of the pentaerythritol tetraester in the pentaerythritol esters is 40% or more.

6. A shock absorber comprising the lubricant composition for shock absorbers as claimed in claim 1.

7. The shock absorber according to claim 6, which is to be interposed between a body and an axle in a vehicle and wherein a mixing ratio of the pentaerythritol tetraester in the pentaerythritol esters is different between a lubricant composition for shock absorbers with which a shock absorber attached to a front wheel side is filled and a lubricant composition for shock absorbers with which a shock absorber attached to a rear wheel side is filled.

8. The shock absorber according to claim 7, wherein supposing that a friction coefficient at the time of transition from a stationary state to a sliding state is B and a friction coefficient in a sliding state is A, a spike index represented by (B−A)/A is smaller in the lubricant composition for shock absorbers with which a shock absorber attached to a front wheel side is filled than in the lubricant composition for shock absorbers with which a shock absorber attached to a rear wheel side is filled.

9. The lubricant composition for shock absorbers according to claim 1, wherein the pentaerythritol esters are contained in 1 wt. % or more based of a total composition.

10. A method of adjusting friction characteristics of a lubricant composition for shock absorbers containing a base oil and pentaerythritol esters,
the pentaerythritol esters containing a pentaerythritol tetraester and a pentaerythritol ester other than the pentaerythritol tetraester, comprising a step of:
adjusting a mixing ratio of the pentaerythritol tetraester and the pentaerythritol ester other than the pentaerythritol tetraester and thereby adjusting friction characteristics of the lubricant composition for shock absorbers.

11. The method of adjusting friction characteristics of a lubricant composition for shock absorbers according to claim 10, wherein supposing that a friction coefficient at the time of transition from a stationary state to a sliding state is B and a friction coefficient in a sliding state is A, a mixing ratio of the pentaerythritol tetraester and the pentaerythritol ester other than the pentaerythritol tetraester is adjusted so that a spike index represented by (B−A)/A be 0.10 or more.

12. The method of adjusting friction characteristics of a lubricant composition for shock absorbers according to claim 10, wherein the mixing ratio of the pentaerythritol tetraester in the pentaerythritol esters is 40% or more.

* * * * *